Aug. 14, 1956 H. H. SCOTT 2,759,049

METHOD AND SYSTEM FOR REDUCING NOISE IN THE TRANSMISSION OF ELECTRIC SIGNALS

Filed Dec. 4, 1951 5 Sheets-Sheet 1

INVENTOR.
Hermon Hosmer Scott
BY Rines and Rines
ATTORNEYS

INVENTOR.
Hermon Hosmer Scott
BY Rines and Rines
ATTORNEYS

Aug. 14, 1956 H. H. SCOTT 2,759,049

METHOD AND SYSTEM FOR REDUCING NOISE IN THE TRANSMISSION OF ELECTRIC SIGNALS

Filed Dec. 4, 1951 5 Sheets-Sheet 3

INVENTOR.
Hermon Hosmer Scott
BY Rines and Rines
ATTORNEYS

Aug. 14, 1956 H. H. SCOTT 2,759,049

METHOD AND SYSTEM FOR REDUCING NOISE IN THE TRANSMISSION OF ELECTRIC SIGNALS

Filed Dec. 4, 1951 5 Sheets-Sheet 4

INVENTOR.
Hermon Hosmer Scott
BY Rines and Rines
ATTORNEYS

INVENTOR.
Hermon Hosmer Scott
BY Rines and Rines
ATTORNEYS

United States Patent Office 2,759,049
Patented Aug. 14, 1956

2,759,049

METHOD AND SYSTEM FOR REDUCING NOISE IN THE TRANSMISSION OF ELECTRIC SIGNALS

Hermon H. Scott, Lincoln, Mass.

Application December 4, 1951, Serial No. 259,873

27 Claims. (Cl. 179—100.4)

Figure 1:
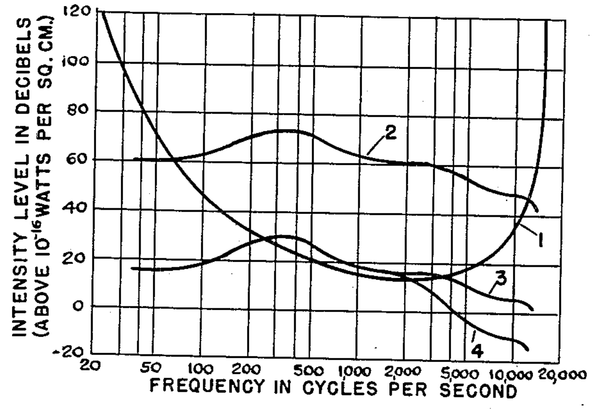

The present invention relates to electric methods and systems, and more particularly to methods of and systems for attenuating or suppressing background noise, interference, and other spurious disturbances during the transmission, the recording, or the reproduction of speech, music, video, and other signals. The term "reducing" or its equivalent will hereinafter be employed generically to include either attenuating or completely suppressing. This application is a continuation in part of copending application, Serial No. 646,621.

Background noise and other extraneous disturbances, at one time or another, are attendant upon practically every form of transmission, recording, or reproducing system. They occur, for example, during the transmission and the reception of the sight and sound channels of television, the presentation of sound-motion pictures, the transmission and reception of signals by wire, telephone, cable, or radio, in relay circuits, and in the reproduction of all types of recording. They have heretofore been attenuated at the expense of seriously impairing the fidelity with which the desired signals have been transmitted. The customary practice has been to adjust the frequency-response characteristic or to restrict the frequency range of the system so as to provide what has been considered to be the best compromise between the fidelity of the transmission and the suppression of the noise. The compromise has not, however, been satisfactory.

Certain automatic means have also been devised for varying the frequency characteristic or the frequency range as a function of the level or some other characteristic of the signal. A most important improvement, as described in copending applications, Serial Nos. 641,673, 642,411, 642,412, 642,961 and 646,620, with filing dates respectively January 17, January 19, January 19, January 23 and February 9, all in 1946, effectively involves restricting the frequency range, as by means of a sharp cut-off and a control circuit, so as to include, in so far as possible, that range only that is necessary to reproduce satisfactorily those components of the signal that are present at sufficient amplitudes to be detectable by the ear or other detecting or receiving means, the control being effected automatically in accordance with some characteristic of the signal.

Since, in all systems, the transmitting means is controlled by the signal itself, however, and as it requires time to transmit a response from the signal, through the controlling means, to the transmitting means, the control cannot become completely effective seasonably to transmit the entire signal without any modification. The result is particularly noticeable in the case of sudden loud transient sounds.

As described in the said copending applications the effect of the noise-suppressor system upon the quality of the reproduction of transients, particularly as heard by the ear, is rendered less noticeable than has heretofore been the case, by adjusting the balance between the high frequencies and the low frequencies and by introducing resonance or other compensating effects to compensate for the attenuation. For systems where maximum fidelity of reproduction is of the utmost importance, however, there is room for still further improvement in the reproduction of transients.

An object of the present invention, therefore, is to prevent the application of the signal to the transmitting means until the control means shall have had time to actuate the transmitting means.

A further object is to improve upon the signal reproduction of systems in which the frequency response or other characteristic is controlled by the signal.

Another object of the invention is to provide a new and improved time-delaying method and means that shall be applicable to many types of circuits or transmission systems.

Still another object is to delay the transmission of the signal until the control system shall have had time to function, thus allowing transmission of the signal with a minimum of modification or distortion.

Another object still is to suppress noise in the reproduction of recorded and other signals with little or no apparent reduction in the quality of the signals, either under steady-state or transient conditions.

With the above ends in view, a feature of the invention contemplates the employment of a time-delay system comprising two pick-up units.

In sound-reproducing systems involving films, noise reduction has customarily been accomplished by biasing the light valve or using a blanking shutter to provide a maximum of opacity in the sound track, thus reducing noise resulting from film graininess, scratches, etc. In other systems, it has been customary to control the overall transmission characteristics in accordance with a so-called pilot signal, which is a tone outside of the normal reproduced range.

A further object of the present invention is to obtain a comparable amount of noise reduction, not only in film-reproducing systems, but in reproducing all types of recordings, and without the use of a pilot tone or a pilot channel.

To the attainment of this end, a feature of the invention resides in the use of two pick-up units, one providing the signal to be reproduced, and the other controlling the transmission of the signal through the system so as to produce the best apparent signal-to-noise ratio. The two pick-ups, as before stated, may also constitute a novel time-delay system, applicable not only to the systems described in the said applications, in which the frequency response is varied, but also to any system in which any response characteristic, such as the gain, may be varied.

Since, in certain types of recordings and, in particular, in disc recordings, the linear speed of the recording varies, still a further object of the present invention is to maintain the time delay substantially constant, regardless of variation in the linear speed of the recording.

Figure 2:
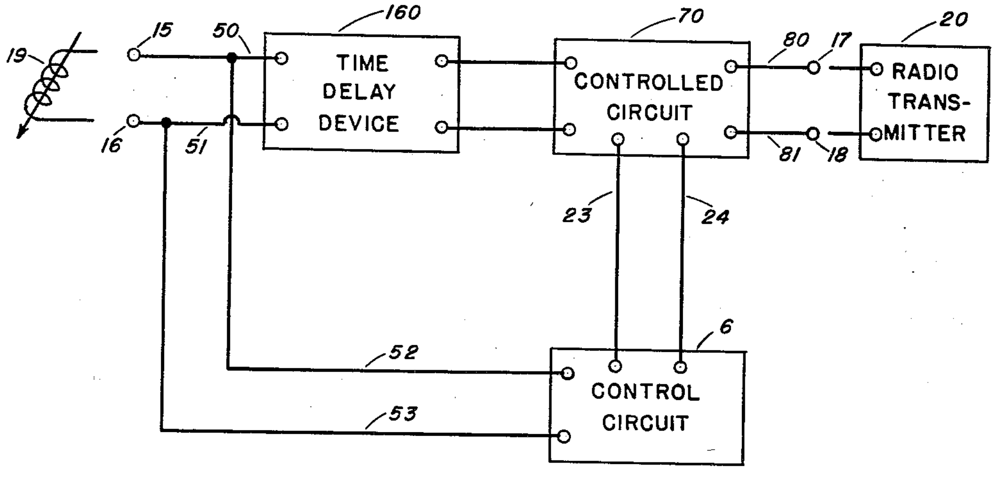
Figure 3:
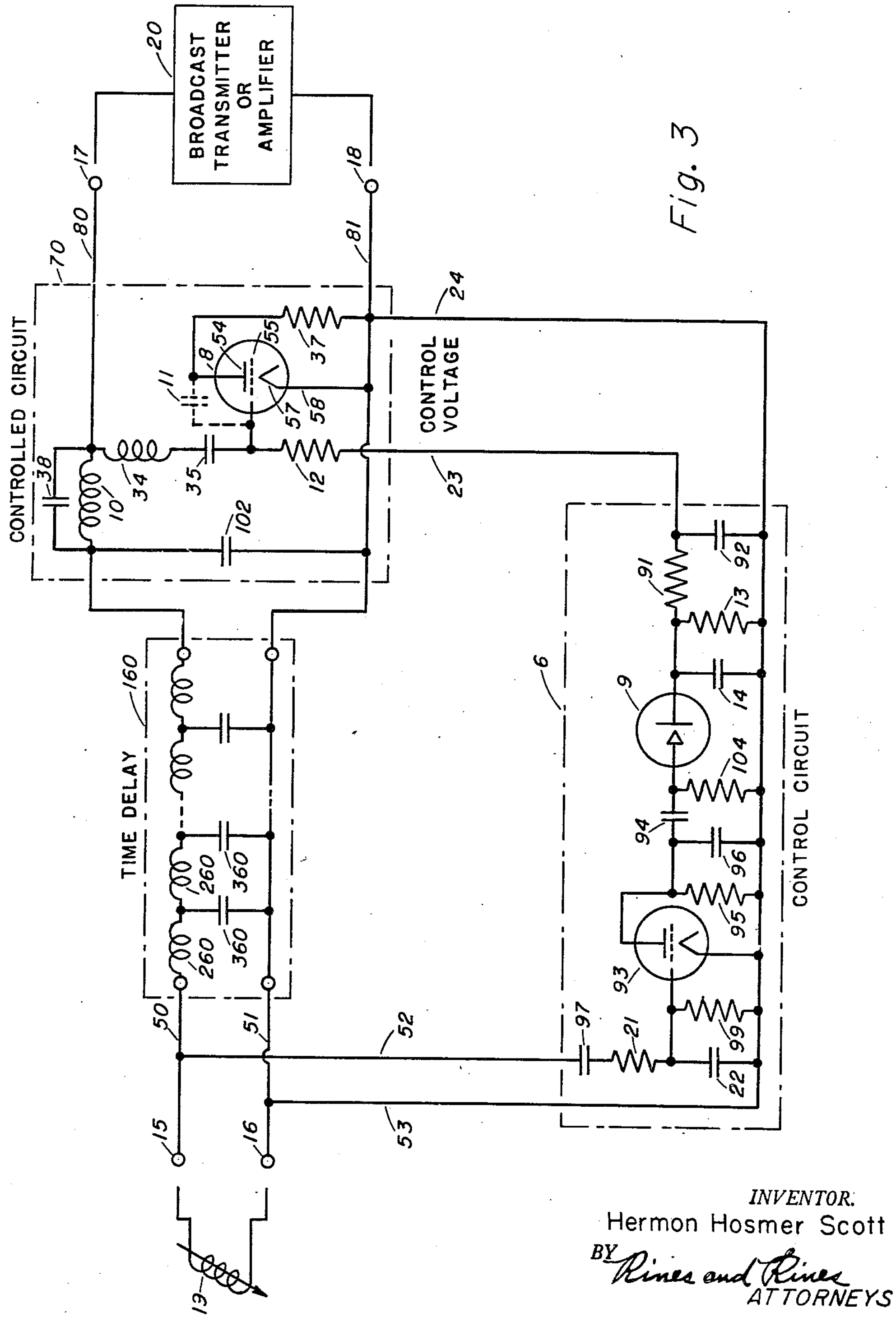
Figure 4:
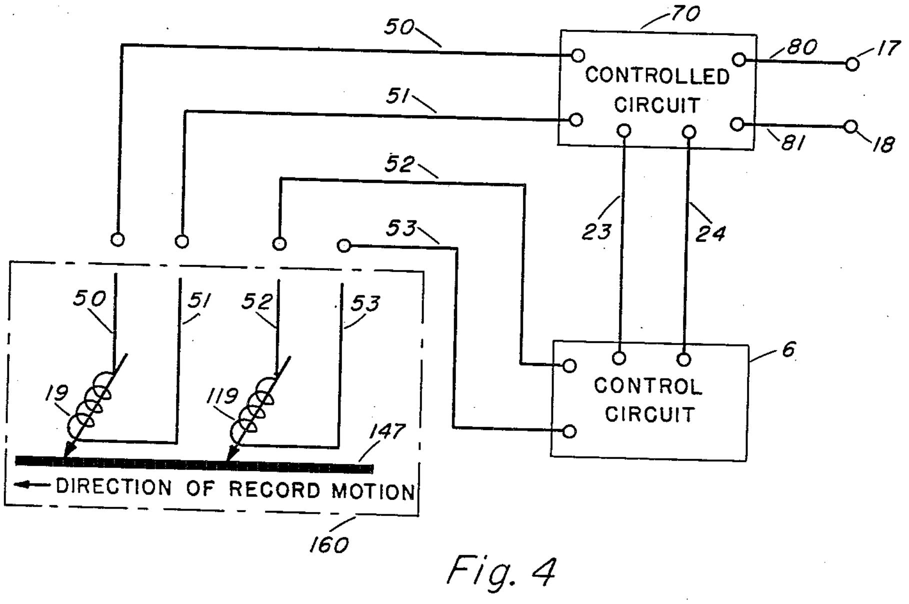
Figure 5:
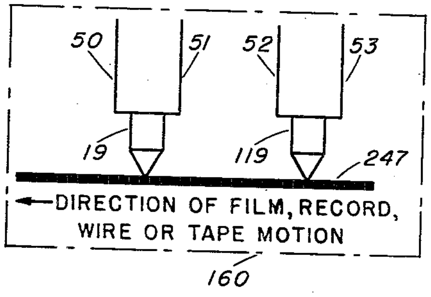
Figure 7:
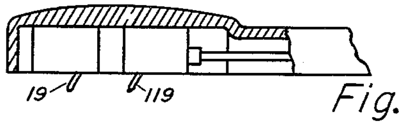
Figure 6:
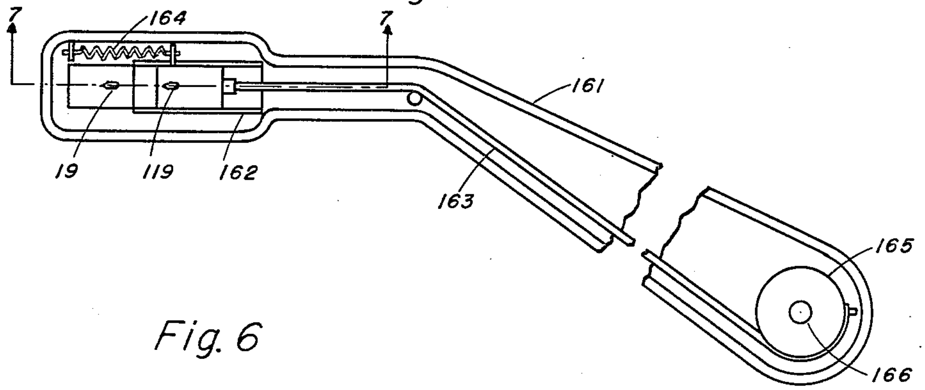
Figure 8:
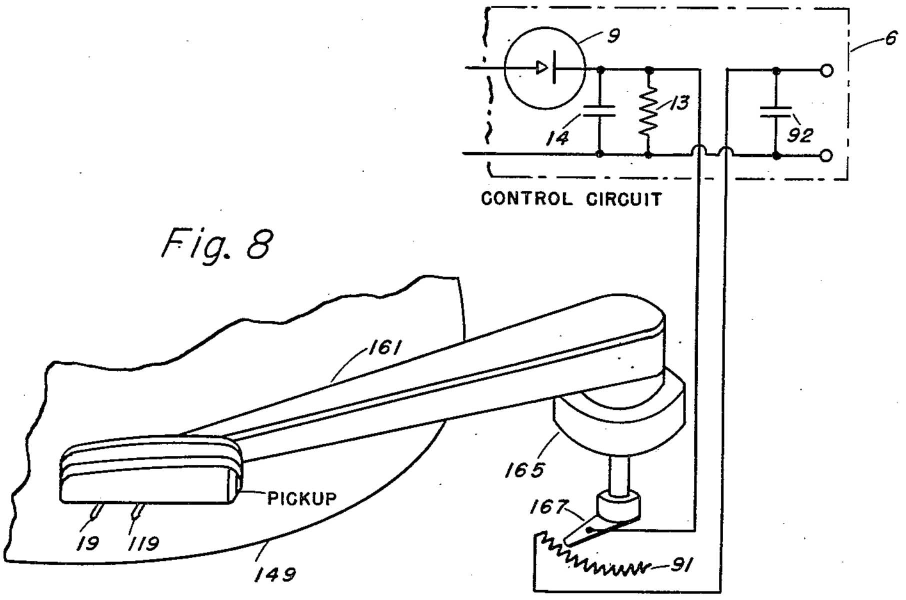
Figure 9:
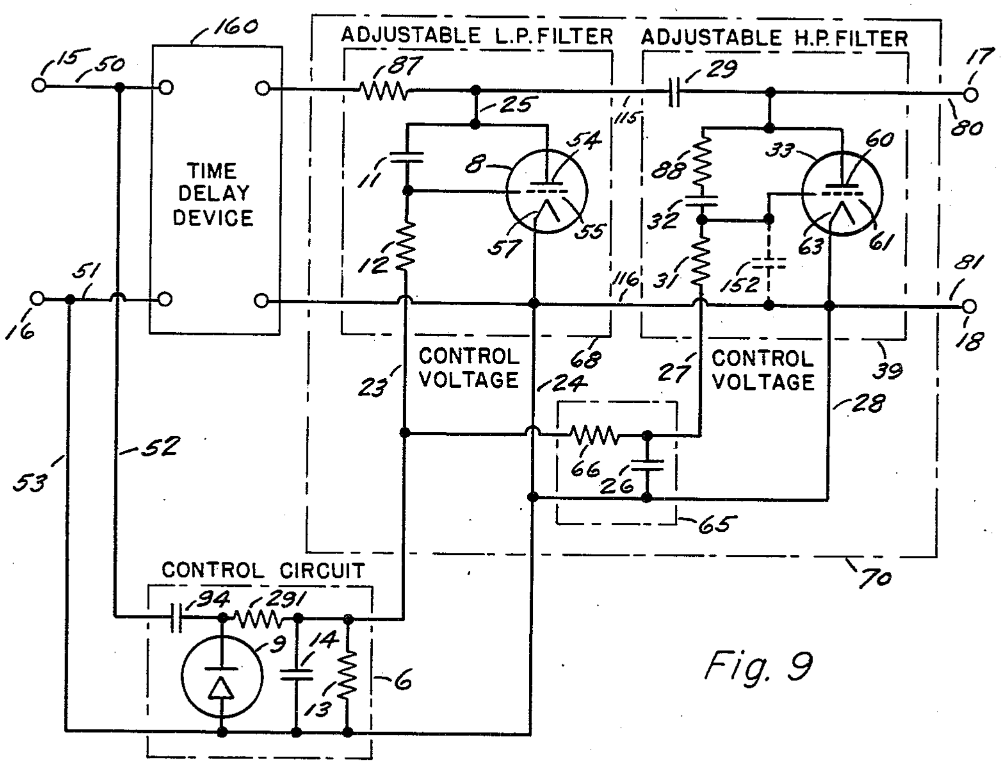
Figure 10:
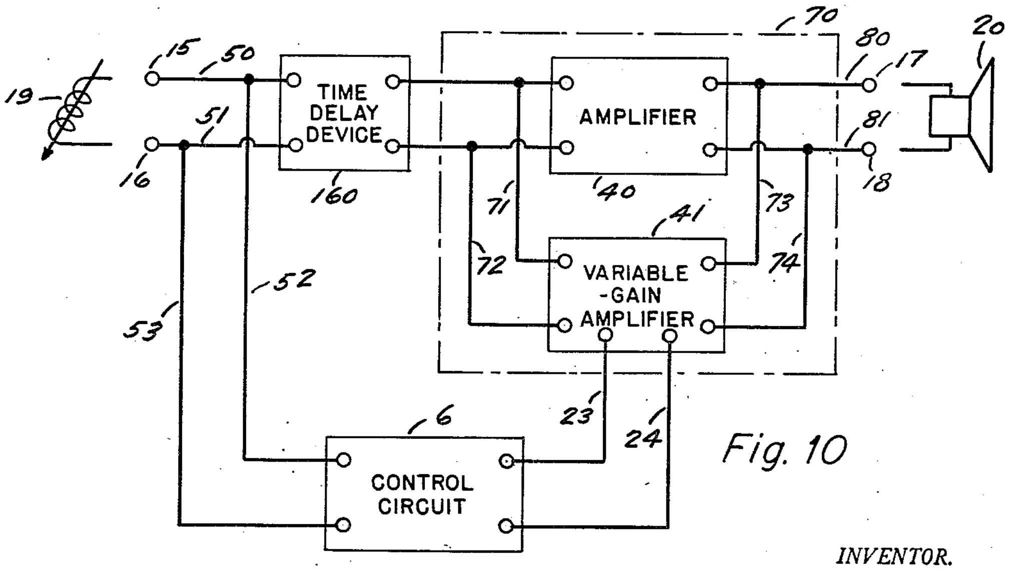

The invention will now be more fully explained in connection with the accompanying drawings, in which Fig. 1 presents a series of graphs representing the frequency-response characteristics of the human ear, and the relative amplitude and frequencies of the various components present in a typical signal, such as orchestral music, the abscissae being plotted logarithmically in terms of cycles-per-second frequency, and the ordinates being plotted arithmetically in terms of decibel intensity units; Fig. 2 is a block-diagram view of a typical system embodying the present invention, and representative of the circuits and apparatus of Figs. 3 to 10; Fig. 3 is a diagrammatic view of circuits and apparatus illustrating an embodiment of the invention, and showing typical circuit elements; Figs. 4 and 5 are similar views of systems similar to the system of Fig. 2, but involving modifications respectively adaptable to disc recordings and other types of recordings, as on film, wire, tape, etc.; Fig. 6 is an underside plan of a phonograph tone arm that may be employed in the system of Fig. 4 or Fig. 5; Fig. 7 is a longitudinal section taken upon the line 7—7 of Fig. 6, looking in the direction of the arrows; Fig. 8 is a perspective view of a modification of the apparatus shown in Figs. 6 and 7, showing also diagrammatically part of a circuit which may be controlled by the position of the tone arm; Fig. 9 is a view similar to Fig. 2, employing adjustable filters, one high-pass and the other low-pass; Fig. 10 is a block-diagram similar to Fig. 2, but applied to circuits employing variable amplifiers and Fig. 11 is a diagrammatic view similar to Fig. 3, but incorporating a number of different types of time delay and circuit variations.

Though the invention will be described in connection with the typical applications illustrated, such as the reproduction of music and other signals from recordings, it may find application in any number of similar systems, operating at audio, video, or other frequencies.

From the curve 1 of Fig. 1, representing the threshold of hearing-sensitivity for an ordinary human ear, it appears that the ear is most sensitive in the region around 2,000 cycles, and that the sensitivity falls off rapidly at both lower and higher frequencies.

The curve 2 may be considered to be representative of the energy-distribution characteristics, as a function of frequency, of typical orchestral music at a particular level. When shifted along the axis of ordinates, to correspond to changes in the volume or intensity of the sound, as in response to a volume control or an attenuator, it intersects the threshold curve 1 at points representing different frequencies. These points represent the limits of the frequency range necessary to reproduce satisfactorily for the listener the particular types of signal at the particular volume or intensity levels. If the level of the curve 2 is reduced equally throughout the range, for instance, to occupy the position of the curve 3, the necessary or perceptible range of frequencies is seen to become accordingly restricted, from about 70 cycles to about 250 cycles at the low-frequency portions of the curves 2 and 3, respectively, and from about 12,000 cycles to about 4,000 cycles at the high-frequency portions of the curve 3. If the music or other signal should have frequency components outside these ranges, they would not be audible.

Most musical instruments, when played softly, moreover, produce a mellower tone than when played loudly, thus indicating the presence of fewer harmonics or overtones falling within the higher-frequency ranges. While the curve 2, as before stated, may become transformed into the curve 3 when the sensitivity of the transmission means is reduced, therefore, it may actually become transformed into the still lower curve 4 if the reduction of volume or intensity is caused by the orchestra playing more softly. The lower curve 4 shows that the before-mentioned low-level limit of 4,000 cycles may thus become reduced to about 2,500 cycles or less when the orchestra is playing softly; the greater part of the audible energy is below this 2,500-cycle value. Since most music, by its very nature, covers an appreciable volume or intensity range, this characteristic offers the further advantageous feature, therefore, that it allows further restriction of the frequency range of the transmission equipment at low-volume or low-intensity levels, from about 4,000 cycles to about 2,500 cycles, without seriously impairing the quality, as perceived by the ear.

The suppression of noise according to the inventions disclosed in the said applications is based upon these and similar factors.

The curves 2 and 4 may, therefore, be regarded as representative of typical signals involving high and low volume or intensity levels, such as may be encountered in the reproduction of music and similar signals, the curve 2 being at an average volume or intensity level of, say 63 decibels in the region around 1,000 to 2,000 cycles, which contributes most to the loudness as heard by the ear, and the curve 4 at a volume or intensity level of approximately 18 decibels in the same range.

In some applications, the high-frequency noises are more annoying than the low-frequency noises; meaning, in music, mainly the range of bass fundamentals, below about 250 cycles, in the region where the human ear is relatively insensitive at low levels. When the high-frequency noises are reduced, however, as described in the said application, Serial No. 641,673, the low-frequency noises become more manifest, so that it becomes then desirable to control the low-frequency components also. A novel method of and system for effecting this result are described in the said application, Serial No. 642,412. It is often, therefore, desirable to provide control of both ends of the frequency spectrum when reproducing recorded music or other signals, because of the attendant reduction of hum, motor-rumble, etc., as well as high-frequency noise.

The said applications disclose also methods of and means for maintaining the apparent quality of reproduction approximately constant, even though the signal and other conditions should vary somewhat from those represented by the curves of Fig. 1. These said methods involve introducing a predetermined amount of resonance into the response of the system when the range is restricted, or maintaining a substantially balanced constant relationship between the volume levels of the high and the low frequencies. The reproduction of transients, as judged by the ear, tends also to be improved.

Referring now to Fig. 2, when an input signal, as from a phonograph pick-up, a radio-receiver, or another source 19, is applied to the input terminals 15 and 16, it is transmitted, by input-lead conductors 50 and 51, through a controlled circuit 70, and by way of output-lead conductors 80 and 81, to the output terminals 17 and 18. These may be connected to any output load 20, such as a load-speaker, an amplifier, or a radio transmitter.

The controlled circuit 70 may, for example, be the wave filter 70 shown in Fig. 3, the wave filters 68 and 39 of Fig. 9, or the amplifiers 40 and 41 of Fig. 10. The present invention is applicable for use with variable filters, variable amplifiers, or combinations of both systems. It may be designed to pass normally only a restricted range of frequencies at low-volume levels. This may be expanded to the full range that it is desirable to transmit at high-volume levels; say, from about 70 to about 12,000 cycles, or from about 90 to about 8,000 or more cycles, or any other range, depending upon the application and limitations of associated equipment. The controlled circuit 70 may also be designed so that it shall be able to attenuate or completely suppress, at low-volume levels, in predetermined ratio, the higher range of frequencies; say, the high-frequency components above about 2,500 cycles and the low-frequency components below about 250 cycles, or some similar values, depending upon the application and other factors.

Referring to the typical practical circuit illustrating the circuit of Fig. 2 that is shown in Figs. 3 and 11, an adjustable low-pass wave filter 70 may be controlled in accordance with the level of the input signals to reduce the high-frequency components of the input signal, at, say, above about 2,500 cycles. This control may take place, at low-volume levels of the low-frequencies of the input signal; say, below about 2,500 cycles. Within the term "low-volume levels," of course, is included levels of zero volume. The wave filter is essentially a low-pass half-section comprising a series arm, connected in the input lead 50, and a shut arm comprising a variable simulated shunt capacitance connected across the output leads 80 and 81.

The series arm of the filter comprises an inductor 10, tuned by means of a parallel-connected capacitor 38 to provide a parallel-resonant circuit. This provides a corresponding fixed point of high or substantially infinite attenuation above the cut-off of the normal transmission range, where the capacitor 38 resonates with the inductor 10. The attenuation of the filter above cut-off becomes thereby improved. By eliminating the tuning condenser 38 in the series arm, the fixed point of high attenuation may be eliminated, where not necessary.

The variable shunt capacitance comprises a capacitive reactance tube 8. The reason why the reactance tube 8 functions as capacitance will be explained presently. The shunt arm comprises also a second inductor 34, connected in series with the variable reactance of the reactance tube 8 and with a capacitor 35 to form a series-resonant circuit variable with the capacitance of the reactance tube 8. This provides a point of high attenuation which may be just above the cut-off frequency that is variable with the cut-off frequency. This variable point may vary in a predetermined relationship with respect to the cut-off frequency. It may vary from a low value, such as 2,500 cycles, to a high value, such as 8,000 cycles or higher, depending upon the characteristics and the limitations of other parts of the system. A resistor 37 may be connected in the output circuit of the reactance tube 8.

This type of filter is characterized by its very sharp cut-off which gives a maximum of noise reduction with a minimum effect upon tones within the desired range. The rate of cut-off of such a filter exceeds considerably that of the usual "tone control," which is an R.-C. or L.-R. combination capable only of an attenuation characteristic that approaches six decibels per octave as a limit.

A condenser 11 may be connected between the anode or plate 54 and the control-grid electrode 55 of the tube 8, thus increasing, if desired, the normal coupling between these electrodes through the internal grid-to-plate capacitance of the tube.

The capacitance 11, if employed, a resistance 12, and the other elements are so connected as to provide a feedback network between the plate or output and the grid or input circuits of the reactance tube 8. This feedback causes a current having a phase lead of approximately 90° with respect to the applied grid voltage of the reactance tube 8 at high frequencies. The grid or input circuit of the tube 8 that is between the grid 55 and the cathode 57 with its associated circuits, therefore, as before stated, functions as a capacitance. The magnitude of this simulated capacitance of the reactance tube 8 is a function of the transconductance of the tube 8 and this, in turn, is a function of the electrode voltages. Other reactance-tube circuits may be used, as, for instance, with the plate or output circuit functioning as a capacitance or reactance. As shown in Figs. 3 and 11 the grid 55 and the condenser 11 are connected in parallel to the output lead 80 through the series-connected inductor 34 and capacitor 35, and the cathode 57 of the tube 8 is connected to the input lead 51 and the output lead 81 by a conductor 58.

The attenuation or suppression may be under the control of a control circuit 6. The input side of the control circuit 6 is subjected to the action of the input signal from the signal source 19 through the medium of lead conductors 52 and 53. In the arrangement of Fig. 3, the lead conductors 52 and 53 are respectively connected to the input leads 50 and 51. The arrangement of Fig. 11 will be described more fully hereinafter. The control circuit 6 is designed so as automatically to shift the response range of the controlled circuit 70.

The output of the control circuit 6 is connected, by a conductor 24, to the cathode 57 and, by a conductor 23, through the resistor 12, to the control grid 55. The resistor 12 thus transmits bias voltage from the control circuit 6 to the grid 55. The grid bias thus developed in the system of the control circuit 6 is therefore transmitted by the leads 23 and 24 to the adjustable filter to impress an adjustable control voltage from the output of the control circuit 6 upon the grid 55.

Most treble tones, or high musical fundamentals, lie below the typical high cut-off frequency of about 2,500 cycles, and are of relatively low frequency compared to the relatively high frequencies. The frequencies, say, between 250 and 2,500 cycles, may be termed medium frequencies. For the larger part, the relatively-high frequencies that are attenuated are the harmonics or overtones of these treble fundamentals plus a few extremely high treble fundamentals constituting a small portion only of the total energy in the music. The adjustments are such that the control circuit 6 automatically adjusts the cut-off frequencies of the filter 70 so as to attenuate all frequency components of the input signal above a predetermined value, such as 2,500 cycles, at low-volume or low-intensity levels of the signal, or predetermined ranges of the signal. The spurious noises accompanying the high-frequency components are thus eliminated at low-volume levels with a minimum effect upon the tone quality. The system thus adjusts itself automatically to the signal to be transmitted.

The low frequencies, as below 250 cycles, may be similarly controlled to reduce low-frequency noise, or both the high and low frequencies may be controlled, which also may maintain balance in addition to suppressing noise. According to the system of Fig. 9, the high and the low frequencies are both controlled. The filter 70 of Figs. 3 and 11 is replaced by two filters 68 and 39; the former, low-pass, for reducing the high-frequency components, as above 2,500 cycles; and the latter, high-pass, for reducing the low-frequency components, as below 250 cycles. The output conductors 115 and 116 of the low-pass filter 68 lead to the input of the high-pass filter 39, and the output of the high-pass filter 39 is connected by the output conductors 80 and 81 to the output terminals 17 and 18.

The input connections of the low-pass filter 68 are similar to those of the low-pass filter 70 of Figs. 3 and 11. The output connections of the control circuit 6 to the low-pass filter 68 are also substantially the same as in the system of Figs. 3 and 11. The series arm impedance 87 may be a resistance, an inductance or a resonant circuit. The connections of the reactance tube 8 of the low-pass filter 68, however, are of a somewhat different type from those in Figs. 3 and 11. The plate 54 or output circuit of the reactance tube 8 is connected to the output lead 115 through the lead 25. With these connections the plate or output circuit of the tube functions as a variable shunt capacitance, since feedback through the condenser 11 causes a current to flow in the plate circuit which leads the applied voltage by approximately 90°. This type of reactance tube circuit is interchangeable with that of Fig. 2, or any other type may be substituted.

The control circuit 6 is shown in Figs. 3, 9 and 11 as comprising a rectifier 9 for rectifying the signal, connected through condenser 94 to the control-circuit-input lead 52, and a condenser 14 connected across the control-circuit-input leads 52 and 53. The resistance of the rectifier 9 with or without the additional resistor 291 and the condenser 14 provide an R.-C. filter circuit for reducing the high-frequency components of the rectified signal voltage. A leak resistor 13 is connected in parallel with the capacitance 14. The rectified voltage of the control circuit varies in accordance with the amplitude of the signal applied to the input terminals 15 and 16. More elaborate control circuits may be utilized.

As shown in Figs. 3 and 11, a filter network may be inserted in the lead conductors 52 and 53, in the input circuit of the control circuit 6, to vary the response of the control circuit 6 with frequency. The filter network is shown comprising a condenser 97 and a resistor 21 connected in series in the control-input conductor 52, followed by a capacitor 22 and a resistor 99 connected in parallel across the circuit, to reduce the sensitivity to very high and low frequencies. The filter is followed by an amplifier for increasing the magnitude or the effectiveness of the control voltage, and to provide optimum control characteristics. The amplifier may comprise a vacuum tube 93 the output circuit of which is provided with a resistor 95. A condenser 96 in parallel with the resistor 95 further reduces the high-frequency response. The series condenser 94, serving as a blocking condenser between the amplifier and the rectifier, may function also to reduce the sensitivity at low frequencies.

The rectifier 9 is shown in Figs. 3, 9 and 11 as series-connected. The rectified voltage appears across condenser 14 and is further filtered by resistor 91 and condenser 92. The leak resistor 13 allows the voltage to follow the amplitude variations of the signal.

The input connections of the control circuit 6 of Fig. 9 are shown substantially the same as those of Figs. 3 and 11. The control circuit 6 of Fig. 9 may exercise such control over the low-pass filter 68 as to cause the reduction of the high-frequency components of the input signal, say above about 2,500 cycles, at the low-volume levels of the low frequency components of a signal such as that represented by the curves 2 and 4 of Fig. 1.

The said filter 39 of Fig. 9 is essentially a high-pass half-section comprising a series capacitance 29, opposite sides of which are connected to the leads 80 and 115, and a variable shunt impedance connected across the leads 80 and 81. The shunt impedance comprises a vacuum tube 33, provided with a feed-back network connected between its anode or plate 60 and its control-grid electrode 61. The feedback network comprises a series-connected resistor 88 and blocking condenser 32 connected across its anode or plate 60 and its control-grid electrode 61, and a resistor 31. If the feedback is controlled mainly by resistors 88 and 31, the tube 33 will function as a variable resistance. If only a small amount of variation is required resistor 88 and blocking condenser 32 may be omitted. On the other hand, for a sharper cut-off the capacitor 152 may be added thus to simulate a variable inductance by introducing a phase lag of approximately 90° between the plate voltage and the plate current of the vacuum tube 33 at low frequencies, the tube 33 thus functioning as an inductive reactance tube.

The resistor 31 is connected between the control circuit 6 and the grid 61 by a conductor 27, similarly to the connection of the resistor 12 to the grid 55 by the conductor 23. The conductor 28 corresponds similarly to the conductor 24. The control circuit 6 thus controls the high-pass filter 39 similarly to the control of the low-pass filter 68.

The output connections of the control circuit 6 to the filter 39 may embody an additional R.-C. filter 65 for the control voltage applied from the control circuit 6 to the high-pass filter 39. This allows control of the low-pass and high-pass filters at different rates. The filter 65 is shown comprising a shunt capacitance 26 and a series resistance 66. Additional filtering may be used, if required, and filters may similarly be introduced into leads 23 and 24.

In the filter 68 of Fig. 9, the inductor 10 and capacitor 38 of Figs. 3 and 11 are replaced by a resistor 87 for the sake of variety. The reactance tube 8 of the filter 68 may simulate a variable capacitance. The corresponding vacuum tube 33 of the filter 39 may simulate a variable resistance or inductance. The filters of Figs. 2 and 9 may be interchanged or other variations used. Typical further variations are shown in the copending applications previously referred to.

The system of Fig. 10 embodies two amplifiers 40 and 41, connected in parallel. The input of the amplifier 40 is connected to the input terminals 15 and 16 by the conductors 50 and 51, and its output is connected to the output terminals 17 and 18 by the conductors 80 and 81. The amplifier 41 is connected to the conductors 50 and 51 by input conductors 71 and 72 and to the output conductors 80 and 81 by output conductors 73 and 74.

The amplifier 40 is of the fixed type, having a limited or restricted frequency range, such as 250 to 2,500 cycles and having, preferably, a sharp cut-off characteristic. The amplifier 41 is of the variable-gain type, covering ranges above and below these predetermined limits, and it is rendered operative by the control circuit 6 and only when the applied signal is sufficiently strong. It therefore reproduces the high-frequency and low-frequency components beyond the normal range of the fixed amplifier 40, under the control of the level of the signal.

The signals are thus passed through two transmission paths or channels represented by the amplifiers 40 and 41. The transmission characteristics of one of the transmission paths are so determined by filter or other components as to include frequency ranges normally attenuated in the other path, but desirable for the reproduction of high-level sounds. If one path is low-pass, the other will be high-pass. If one path is band-pass, the other will be band-elimination. In the system of Fig. 10, the filter associated with the amplifier 40 may be band-pass, and the filter associated with the amplifier 41 may be band elimination. A circuit showing actual circuit elements in accordance with the system of Fig. 10 is described in the said copending application, Serial No. 642,961, which describes also other variations including two or more variable amplifiers and combinations of variable amplifiers and filters. Any of these may be substituted for the controlled circuit 70 of Figs. 2 and 4.

If the frequency ranges to be transmitted are classified as low, medium and high, and two of these ranges considered as a unit and the other range as another unit, one transmission channel may transmit one of these units, and another channel the other unit, the unit not containing the medium frequencies being transmitted subject to control by the total signal level or by the level of the unit which contains the medium-frequency range. Similarly each of the three ranges may be transmitted separately, or a plurality of ranges may be transmitted separately, each transmitting channel subject to control by the total level, the level in that channel, the level in another channel, or some other characteristic of the signal.

In Fig. 10 the control of the control circuit 6, actuated, as before described, in accordance with the amplitude of the applied signal, is such as to permit the restricted-range amplifier 40 to operate only at low levels, and both amplifiers to operate at high levels. The overall response of the system will thus vary with the level of the applied signal. Those frequencies only will tend to be included that are necessary for satisfactory reproduction of the signal at the volume level existing at any particular moment. At low-volume levels, therefore, the restricted-range amplifier 40 is alone in operation. The high-frequency or the low-frequency components, with their accompanying noises, are eliminated by reason of the inoperability of the amplifier 41, at this time, to transmit them, but the balance between the high-frequency and the low-frequency responses is maintained.

When the signal level is low, the frequency range is restricted, or certain parts of the range are reduced as heretofore explained. When a sudden loud signal or transient must be reproduced it is desirable to expand the frequency range, or restore the reduced parts or decrease the reduction of the range as rapidly as possible to avoid modification of the initial portion of the signal.

When the same signal is applied simultaneously to the controlled and to the control circuits in the systems of Figs. 3, 9, 10 and other systems, it is impossible, in some cases, for the control to take effect seasonably. There are practical limitations to the speed at which the control can be exercised. These naturally affect the reproduction of sudden loud transients involving frequencies in the range under control and the suppression noise immediately following loud signals.

To obviate this defect, a time-delay device 160 is shown connected in the input-lead conductors 50 and 51. The time-delay device may be electrical, as illustrated in Fig. 3, mechanical, as shown in Figs. 4 to 7, or mechanical-electrical, as illustrated in Figs. 8 and 11. Its function is to delay the application of a signal to the controlled circuit 70 until the control circuit 6 shall have had time to operate and adjust the response characteristics or control the degree or change of reduction of the controlled circuit 70 to transmit the signal properly. The time-delay device 160 may be inserted into the main transmission system between the point from which the control is derived and the controlled point, as shown. This tends to improve the reproduction of transients by allowing the system frequency range to expand fully or restoring the reduced portions of the range before the transients or other signals are applied to the controlled circuit 70. This allows the system to be able to transmit before the signal is applied by delaying the application of the signal, or portion of the signal, to the system until transmission can be effected without modification.

The typical electrical time-delay circuit 160 of Figs. 3 and 11 is illustrated as comprising an artificial transmission line having an indefinite number of sections each comprising series inductive arms 260 and shunt capacitive arms 360. Since the phase shift per section of such a transmission line approaches 180° at high frequencies within the transmission band, an appreciable time delay will be obtained by this system if sufficient sections are used. The phase-shift circuit may be so designed that the time delay shall be substantially proportional to the frequency, under which conditions no phase distortion of the signals will take place. The time delay may be varied by varying the circuit elements of the time delay. Substitution of reactance tubes for physical reactors or capacitors will facilitate this variation.

In applications involving phonograph records, wires, tapes, and the like, the time delay may be obtained by mechanical means, as shown in Figs. 4 to 8 and 11, involving two phonograph pick-up units 19 and 119 on a phonograph record 147 or 149, or any other type of recording, as on film, wire, tape, etc. 247. The output of the pick-up unit 119 is connected to the conductors 52 and 53, in order to actuate the control circuit 6. The pick-up unit 119 is mounted directly behind the pick-up unit 19 so as to contact any point in the record groove a short time interval before the pick-up unit 19. With the motion of the record surface 147, 149 or 247 in the direction of the arrow, for instance, a given signal will reach the pick-up unit 119 before the pick-up unit 19. The signal thus obtained from the pick-up unit 119 may effect actuation of the control circuit 6 before the same signal is later applied to the controlled circuit 70. Since the groove modulations of the record, representing a loud transient, will actuate the control circuit 6 through the pick-up unit 119 a short time interval before they are transmitted by the pick-up unit 19 to the controlled circuit 70, there is opportunity for the controlled circuit 70 to be sufficiently expanded in range before the signal is impressed upon it, so that it may reproduce the signal with no distortion. The first pick-up unit 119, as before explained, controls the range, therefore, and the second pick-up unit 19 provides the signal to be reproduced in the control circuit 70, and which is later evidenced at the terminals 17 and 18 after noise suppression. Results may thus be obtained from ordinary recordings similar, in effect, to those obtained by special recordings using a "control" track or channel.

In the case of disc records 147 and 149, the two pick-up units 19 and 119 may be mounted on a single pick-up arm 161, pivoted at 166, as shown in Figs. 6 to 8 and 11. For the usual types of disc records, however, the actual delay time will vary as a function of the distance from the center of the record, since the record is normally revolving at a constant speed. In many instances, it will be satisfactory to pick an average value of time delay that will give satisfactory results over the normal or average record. In the arrangements of Figs. 6, 7 and 11, however, additional means are shown for varying the time delay. The pick-up arm 161 supports the two pick-up units 19 and 119, the latter being free to slide in a groove 162. Motion in one direction is effected by means of a cable 163; in the other, by a spring 164. The cable 163 is wrapped around and fastened to a fixed supporting post 165 for the pick-up arm 161. As the pick-up arm is moved back and forth over the surface of the record 147 or 149, therefore, the pick-up unit 119 slides back and forth in the groove 162, thus providing a variable location with respect to the pick-up unit 19. A mechanical time delay is thus provided, with mechanical means for varying it. Other mechanical linkages may, of course, be used to obtain a similar effect.

According to the arrangement shown in Figs. 8 and 11, the response rate of the control circuit 6, and thus the effective delay time, is varied as a function of the position of the pick-up arm 161. An electric contact member 167, cooperating with the resistor 91 of the control circuit 6, moves with the pick-up arm 161 to control the value of the resistance of the resistor 91. Increasing the value of this resistance effects slowing down the rate of control, and vice versa. A mechanical time delay is thus provided, with electrical means for varying the effective delay time.

It will be observed that the pickups in Figs. 6, 7, 8 and 11 are coupled together mechanically. In Fig. 8, for instance, the styli 19 and 119 may have a fixed mechanical relationship, regardless of the position of the arm 161. A similar situation would generally obtain in connection with wire, tape or other recordings which are reproduced at a constant velocity, as, for instance, the systems depicted in Figs. 4 and 5. In the system of Figs. 6, 7 and 11 the pickup units are still coupled together mechanically but the spacing is variable, depending upon the position of the arm, as previously described. For the purposes of this specification, pickups will be considered as coupled together mechanically when they are mounted in such a way that any movement of one causes a movement, not necessarily identical, of the other.

Though the arrangement shown in Figs. 8 and 11 is typical and practical because of its extreme simplicity, more complicated arrangements may also be used, whereby the position of the pick-up arm 161 may control variable inductors, condensers, resistors or vacuum tubes, which may comprise parts of the control circuit 6 or an electrical time day circuit such as 160.

Wherever the system is such that the linear speed of the recording past the pick-up units 19 and 119 does not vary appreciably, there is, of course, no need of the variable features described in connection with Figs. 4 to 8 and 11. These variable features are not needed, for example, in connection with the magnetic tape, wire or film recording-reproducing system 247 of Fig. 5, if the linear speed is constant.

With the usual wire or magnetic recording 247, two pick-up heads are normally utilized: one, as the pick-up unit 19, for reproducing the signal, and the other, as the pick-up unit 119, for recording purposes. With such a system, it is not necessary even to add an additional pick-up head for utilizing the method of noise suppression according to the present invention, since the recording head 119 is generally quite adequate as a pick-up unit for control purposes.

Fig. 11 incorporates several types of time delay which may be used in various combinations. With the switch 200 in position A, the mechanical time delay between the phonograph pickup units 119 and 19 is utilized as in Fig. 4. A variable time delay is secured by the variation of resistor 91 as the pick-up arm 161 moves across the record 149 as in Fig. 8. The electrical time delay 160, as shown in Fig. 3, is also present, although in some instances it may be omitted.

When the switch 200 is thrown to position B an alternative time delay is utilized in place of that associated with the spacing between the phonograph pick-ups 119 and 19. Under this condition of operation, a continuous tape, wire or other recording material capable of being erased is utilized. This endless recording 247 moves on the drums 248 and 249, one or both of which are driven at a constant speed. The material of which the recording 247 is made is capable of being erased and the head 219 is a conventional erase head, utilizing for instance fixed or high-frequency magnitization, or some other arrangement known to the art. The pick-ups, or heads, 319 and 419, are similar to 19 and 119 in Fig. 5 respectively, except that in this case 419 is used for recording purposes. The input signal, in this case from the phonograph pick-up 119, is transferred by leads 52 and 53 to recording head 419. An amplifier 140 may be inserted in leads 52 and 53 as shown to provide suitable level. Leads 52 and 53 are also connected to the input of the control circuit 6.

The pick-up 319 corresponds to pick-up 19 in Fig. 5, picking up the recording signal from the tape or other recording medium 247 and applying it to the input leads 50 and 51 and thence to the controlled circuit 70. The electrical time delay 160 may also be used as shown or it may be omitted. In operation, therefore, a signal is recorded on the recording medium 247 by the head 419 and also applied to the control circuit 6. A predetermined length of time later, depending upon the speed of the recording 247 and the spacing between the heads 419 and 319, the signal is picked up by the pick-up 319 and transmitted to the controlled circuit 70. The signal is then erased by the erase head 219. In this manner the tape can be used continuously over and over again providing the desirable time delay, with only a short length of continuous tape.

The actual circuit of the controlled circuit 70, as shown in Fig. 11, differs somewhat from Fig. 3 to provide variety. Both circuits are interchangeable, or those of Figs. 9 and 10 may also be substituted.

The mechanical and electrical types of time delay may be used interchangeably or in combination. For instance, the systems of Figs. 4, 5, 6, 7, 8 and 11 may be used in connection with Figs. 2, 3, 9 and 10 either in addition to or in place of the electrical time delay.

In accordance with the usual conventions in the showing of vacuum-tube circuits, the well known operating voltage sources, like batteries, power supplies, voltage dividers, bias resistors, and their accompanying blocking or filter condensers, feed resistors or chokes, and the like, are not illustrated.

Additional electrodes may be added to the vacuum tubes, or other controlled impedances such as saturated reactors, current-controlled resistors, etc. may be substituted for the vacuum tubes.

Further modifications will occur to those skilled in the art, and all such are considered to fall within the spirit and scope of the present invention, as defined in the appended claims.

What is claimed is:

1. An electric system having, in combination, means for transmitting signals comprising means controlled by the signals when the level of the signals falls below a predetermined value to reduce predetermined frequency components of the signals, and means for delaying the transmission of the signals until the reduction has occurred.

2. In the transmission of signals accompanied by spurious components having three types of frequency components, namely, relatively-high-frequency components, relatively-low-frequency components, and components of medium frequency, according to which two of the types are transmitted as a unit and the third type is transmitted as a unit, a method of the character described that comprises the step of transmitting that unit that does not contain the medium-frequency components when the level of the frequency components of the other unit rises above a predetermined value, and delaying the transmission of the signals until the transmission step can be effected.

3. An electric system having, in combination, means for transmitting signals comprising two types of frequency components, namely, relatively-high-frequency components and relatively-low-frequency components, comprising a filter having a cut-off frequency for reducing the frequency components of one of said types, means effective when the level of predetermined frequency components of the signals rises above a predetermined value to vary the cut-off frequency, and means for delaying the transmission of the signals until the variation has occurred.

4. An electric system having, in combination, means for transmitting signals having two types of frequency components, namely, relatively-high-frequency components and relatively-low-frequency components, comprising a filter for reducing the frequency components of one of said types, means effective when the level of the frequency components of the other type rises above a predetermined value to render the filter ineffective, and means for delaying the transmission of the signals until the filter has been rendered ineffective.

5. In an electric system for transmitting signals having two types of frequency components, namely relatively-high-frequency components and relatively-low-frequency components, a method of the character described that comprises reducing the frequency components of one of the types when the level of the predetermined frequency components of the signals falls below a predetermined value, controlling the degree of reduction in accordance with said level, and delaying the transmission of the signals until the control has been effected.

6. In the transmission of signals having two types of frequency components, namely, relatively-high-frequency components and relatively-low-frequency components, a method of the character described that comprises reducing the frequency components of one of said types at a rate exceeding about six decibels per octave, decreasing the reduction in accordance with the signals, and delaying the transmission of the signals until the decrease in reduction has occurred.

7. A reproducing system for reproducing signals recorded on a sound track which signals may be accompanied by spurious components said system having, in combination, a reproducer, means for transmitting signals to the reproducer, two pick-up units spaced along the sound track, means for relatively moving the sound track and the pick-up units in order that the pick-up units may successively pick up the signals from the sound track, means for applying to the transmitting means, for transmission by the transmitting means, the signals picked up by one of the pick-up units, means for reducing the spurious components, and means connecting the other pick-up unit to the reducing means and the reducing means to the transmitting means to reduce the spurious components of the signals in the transmitting means.

8. A transmission system having, in combination, means for transmitting signals, two pick-up units for picking up signals which may be accompanied by spurious components, means for applying to the transmitting means, for transmission by the transmitting means, the signals picked-up by one of the pick-up units, means for reducing spurious components in the transmitted signal, means connecting the other pick-up unit to the reducing means and the reducing means to the transmitting means to reduce the spurious components in the transmitting means, and means for delaying the application of the signals by the applying means to the transmitting means a predetermined length of time during which the reducing means may reduce the spurious components of the signals in the transmitting means.

9. A transmission system having, in combination, a transmission path for transmitting signals and having variable frequency-transmission characteristics, two pick-up units for picking up the signals, means for applying to the transmission path, for transmission by the transmission path, the signals picked up by one of the pick-up units, and means controlled by the other pick-up unit for controlling the frequency-transmission characteristics of the transmission path.

10. A system for reproducing sound signals recorded on a sound track, having in combination, a reproducer for reproducing signals, an electric-circuit transmission path for transmitting signals for reproduction to the reproducer, two pick-up units for picking up signals from the sound track, means connecting one of the pick-up units to the electric-circuit transmission path in order to apply the signals recorded on the sound track to the electric-circuit transmission path, and means controlled by the other pick-up unit in accordance with the signals recorded on the sound track for controlling the frequency response of the electric-circuit transmission path.

11. A system for reproducing signals having different frequency components having, in combination, a reproducer for reproducing signals, means for transmitting signals for reproduction to the reproducer, two pick-up units for picking up signals having different frequency components, means for applying the signals picked up by one of the pick-up units to the transmitting means, and means controlled by the other pick-up unit in accordance with the signals, for controlling the frequency response characteristic of the transmitting means.

12. A transmission system having, in combination, means comprising a normally ineffective reactance tube for transmitting signals having relatively-high-frequency components and relatively-low-frequency components, means for rendering the reactance tube effective to reduce the relatively-high-frequency components when the level of the relatively-low-frequency components falls below a predetermined value, and means for delaying the transmission of the signals until the reduction has taken place.

13. A transmission system having, in combination, means for transmitting signals having relatively-high-frequency components and relatively-low-frequency components, comprising means for reducing the relatively-high-frequency components and intensifying a predetermined group of the relatively-low-frequency components, means for controlling the reduction and the intensification in accordance with the signals, and means for delaying the transmission of the signals until the reduction and intensification have taken place.

14. A transmission system having, in combination, means for transmitting signals having relatively-high-frequency components and relatively-low-freqeuncy components comprising means for reducing the relatively-high-frequency components at a rate exceeding about six decibels per octave, means for controlling the reduction in accordance with the signals, and means for delaying the transmission of the signals until the reduction has taken place.

15. A transmission system having, in combination, means for transmitting signals having relatively-high-frequency components and relatively-low-frequency components comprising means for reducing the relatively-high-frequency components at a rate exceeding about six decibels per octave, means controlled in accordance with the amplitude of the relatively-low-frequency components for controlling the reducing means, and means for delaying the transmission of the signals until the reduction has taken place.

16. A transmission system having, in combination, means for transmitting signals comprising a filter having an inductance and a reactance tube, means controlled in accordance with the signals for controlling the reactance tube to vary the cutoff of the filter, and means for delaying the transmission of the signals until the reduction has taken place.

17. A transmission system having, in combination, means for transmitting signals comprising a filter whose characteristics are controlled by a reactance tube, means controlled in accordance with the signals for controlling the reactance tube to vary the cutoff of the filter, and means for delaying the transmission of the signals until the reduction has taken place.

18. A transmission system having, in combination, means for transmitting signals comprising a vacuum tube having an input circuit and an output circuit, means for coupling the circuits to cause the output to simulate a capacitive reactance, means for reducing the signals, means for delaying the transmission of the signals until the reduction has taken place, and means controlled by the signals for controlling the capacitive reactance.

19. A transmission system having, in combination, a transmission path for transmitting signals and having variable frequency-transmission characteristics, a continuous, endless record of recording material capable of being erased, a recording head, a pick-up head and an erase head, means driving said recording continuously past said heads in said sequence, means applying signals to said recording head thereby recording said signals on said recording material, means controlled by the signal applied to said recording head for controlling frequency transmission characteristics of said transmission path, means picking up said signals from said pick-up head and applying said picked-up signals to said transmission path, and means for erasing said signal from said recording medium after said signal is picked up by said pick-up unit.

20. A system for reproducing sound signals recorded on a sound track on a disc record and having, in combination, two pick-up units for engaging the track and coupled together mechanically, means controlled by one of the units for reproducing the signal recorded on the track, means controlled by the other unit for controlling the characteristics of the reproduced signal thus producing mechanically a time delay between said control action and the reproduction of the signal, further means for delaying the control of the signals a predetermined length of time, and means for controlling said last named predetermined length of time in accordance with the distance of the units from the center of the record.

21. A system for reproducing sound signals recorded on a sound track on a disc record having, in combination, two pick-up units for engaging the track and coupled together mechanically, means controlled by one of the units for reproducing the signal recorded on the track, means controlled by the other unit for controlling the characteristics of the reproduced signal thus producing mechanically a time delay between said control action and the reproduction of the signal, and means for varying the relative spacing of the units on the track thus controlling said mechanically-produced time delay in accordance with the distance from the center of the record of the units on the track.

22. In the transmission of signals, a method of the character described that comprises varying the transmission of predetermined frequency components by reducing the transmission of predetermined frequency components of the signals when the level of the signals falls below a predetermined value and restoring the transmission of the predetermined frequency components to their normal relative amplitude when the level of the signals exceeds a predetermined value, and delaying the transmission of the signals until the said variation has occurred.

23. An electric system having, in combination, means for transmitting signals having relatively-high-frequency components and relatively-low-frequency components comprising means for transmitting the relatively-low-frequency components continuously, means effective when the level of the signals rises above a predetermined value to transmit the relatively-high-frequency components, and means for delaying the transmission of the signals until the last-named means has become effective.

24. An electric system having, in combination, means for transmitting signals having relatively-high-frequency components and relatively-low-frequency components, comprising means for transmitting the relatively-high-frequency components continuously, means effective when the level of the relatively-high-frequency components rises above a predetermined value to transmit the relatively-low-frequency components, and means for delaying the transmission of the signals until the last-named means has become effective.

25. In the transmission of signals having relatively-low-frequency components, relatively-high-frequency components, and components of medium frequency, a method of the character described that comprises reducing the relatively-low-frequency and the relatively-high-frequency components, maintaining a predetermined relationship between the relatively-low-frequency components and the relatively-high-frequency components, decreasing the amount of reduction in accordance with the signals and delaying the transmission of the signals until the decrease in reduction has occurred.

26. An electric system having, in combination, means for transmitting signals having relatively-low-frequency components, relatively-high-frequency components, and components of medium frequency, the transmitting means comprising filter means having cut-offs at predetermined frequencies for reducing the relatively-low-frequency components and the relatively-high-frequency components, means effective when the level of the signals falls below a predetermined value for varying the cut-off frequencies in a predetermined relationship at different rates, and means for delaying the transmission of the signals until the variation in the cut-off frequencies has taken place.

27. An electric system having, in combination, means for transmitting signals having relatively-low-frequency components, relatively-high-frequency components, and components of medium frequency, the transmitting means comprising a filter having at least two reactive arms, means controlled in accordance with the signals for varying the reactance of one or more arms to reduce the relatively-high-frequency components or the relatively-low-frequency components, and means for delaying the transmission of the signals until the variation has occurred.

References Cited in the file of this patent

UNITED STATES PATENTS

| | | |
|---|---|---|
| 1,738,000 | Green | Dec. 3, 1929 |
| 1,776,821 | Strieby | Sept. 30, 1930 |
| 2,077,466 | Dreyer | Apr. 20, 1937 |
| 2,079,959 | Fear | May 11, 1937 |
| 2,096,757 | Purington | Oct. 26, 1937 |
| 2,148,030 | McLennan | Feb. 21, 1939 |